US009159116B2

(12) United States Patent
Plagemann et al.

(10) Patent No.: US 9,159,116 B2
(45) Date of Patent: Oct. 13, 2015

(54) ADAPTIVE SCREEN INTERFACES BASED ON VIEWING DISTANCE

(71) Applicant: Google Inc., Mountain View, CA (US)

(72) Inventors: Christian Plagemann, Palo Alto, CA (US); Alejandro Kauffmann, San Francisco, CA (US)

(73) Assignee: Google Inc., Mountain View, CA (US)

( * ) Notice: Subject to any disclaimer, the term of this patent is extended or adjusted under 35 U.S.C. 154(b) by 76 days.

(21) Appl. No.: 13/765,877

(22) Filed: Feb. 13, 2013

(65) Prior Publication Data
US 2014/0225931 A1  Aug. 14, 2014

(51) Int. Cl.
*G06F 3/01* (2006.01)
*G06F 3/0488* (2013.01)
*G06T 3/40* (2006.01)
*G06F 3/00* (2006.01)

(52) U.S. Cl.
CPC . *G06T 3/40* (2013.01); *G06F 3/005* (2013.01); *G06F 3/017* (2013.01); *G06F 3/0488* (2013.01); *G06F 2203/04806* (2013.01)

(58) Field of Classification Search
CPC ... G06F 3/0488; G06F 3/04842; G06F 3/017; G06F 3/0416; G06F 3/0484; G06F 3/16; G06F 3/167; G06F 21/31; G06F 2203/04108; G06K 9/00221; H04W 12/02; G06Q 30/0261
USPC ........ 345/660, 667, 665, 168, 169, 173, 650; 715/863, 864, 764; 710/5; 714/27
See application file for complete search history.

(56) References Cited

U.S. PATENT DOCUMENTS

| 8,928,590 | B1* | 1/2015 | El Dokor | 345/168 |
| 2008/0162997 | A1* | 7/2008 | Vu et al. | 714/27 |
| 2009/0228841 | A1 | 9/2009 | Hildreth | |
| 2010/0080084 | A1* | 4/2010 | Chen et al. | 367/118 |
| 2011/0093820 | A1 | 4/2011 | Zhang et al. | |
| 2011/0119640 | A1 | 5/2011 | Berkes et al. | |
| 2011/0234492 | A1 | 9/2011 | Ajmera et al. | |
| 2011/0292084 | A1 | 12/2011 | Thomas | |
| 2012/0013806 | A1 | 1/2012 | Hsieh | |
| 2012/0131229 | A1* | 5/2012 | McCarthy et al. | 710/5 |
| 2013/0016129 | A1* | 1/2013 | Gossweiler III et al. | 345/667 |
| 2013/0215038 | A1* | 8/2013 | Senanayake et al. | 345/169 |
| 2013/0300668 | A1* | 11/2013 | Churikov et al. | 345/168 |

(Continued)

OTHER PUBLICATIONS

Vogel D et al: "Interactive Public Ambient Displays: Transitioning from Implicit to Explicit, Public to Personal, Interaction with Multiple Users," Internet Citation, Oct. 2004, Retrieved from the Internet: URL:http://www.dgp.toronto.edu/papers/dvogel_UIST2004.pdf [retrieved on Mar. 22, 2007].
International Search Report and Written Opinion in International Application No. PCT/US2014/015742, mailed Jul. 9, 2014, 18 pages.

(Continued)

*Primary Examiner* — Chante Harrison
(74) *Attorney, Agent, or Firm* — Fish & Richardson P.C.

(57) ABSTRACT

Voice commands and gesture recognition are two mechanisms by which an individual may interact with content such as that on a display. In an implementation, interactivity of a user with content on a device or display may be modified based on the distance between a user and the display. An attribute such as a user profile may be used to tailor the modification of the display to an individual user. In some configurations, the commands available to the user may also be modified based on the determined distance between the user and a device or display.

14 Claims, 5 Drawing Sheets

(56) References Cited

U.S. PATENT DOCUMENTS

2014/0100955 A1* 4/2014 Osotio et al. .................. 715/764
2014/0285458 A1* 9/2014 Kim ............................. 345/173
2014/0354695 A1* 12/2014 Sakai ........................... 345/650

OTHER PUBLICATIONS

International Preliminary Report on Patentability in International Application No. PCT/US2014/015742, mailed Aug. 27, 2015, 13 pages.

* cited by examiner

ADAPTIVE SCREEN INTERFACES BASED ON VIEWING DISTANCE

BACKGROUND

Digital screens are present in many environments such as gaming environments, malls, restaurants, businesses, and homes. In addition, many touch or input device autonomous systems exist. In a gaming environment a console may have a depth camera connected to it that communicates information about a user's body position to the console. The console may animate a character on a screen according to the user's gestures. For example, if the user gestures to throw a punch in a boxing game, a character on the screen may be displayed as throwing a punch with the same hand using a predefined animation sequence.

BRIEF SUMMARY

According to an implementation of the disclosed subject matter, a distance between a user and a device such as a display may be determined. Based on the determined distance and an attribute, a presentation style of content on the display may be selected. An attribute may include, for example: user height, content context, a user profile, a user number, an environment, and a vantage point. At least a portion of commands may be determined to be available to the user based on one or more of the determined distance, the attribute, and the presentation style. A portion of the content on the display may be modified based on the presentation style of content.

In an implementation, a scaling function for a display may be received. Content for the display may be received. A distance between the user and the display may be determined. An output of the display may be modified based on the determined distance and the scaling function.

In an implementation, a system is provided that includes a database and a processor. The database may store, for example, a user preference, an attribute, a presentation style, information about a display, or the like. A processor may be connected to the display. The processor may be configured to receive a scaling function for a display. It may receive content for the display. In some configurations, the processor may determine a distance between a user and the display or it may receive an indication thereof. The processor may modify an output of the display based on the determined distance and the scaling function.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Content on a display or device may be modified based on a distance between an individual and the device. For example, the amount of information or content shown on the screen may increase the closer the user is to the screen. Similarly, the commands that are available or presented to the user may be adapted based on the user's distance from the monitor.

In an implementation, a distance between a user and a display is determined. Based on the determined distance, a presentation style of content on the display may be selected. A presentation style may refer to how content is displayed on the display. A gesture input may be received and at least a portion of the content on the monitor may be modified based on the received gesture input and the presentation style of content.

In an implementation, a distance between a user and a monitor is determined. Based on the determined distance, available commands may be determined. A command may refer to the gesture commands available to the user based on the distance the user is from the monitor. In some configurations, a gesture input may be received and at least a portion of the content on the monitor may be modified based on the received gesture input and the available commands capability. A command may refer to the number of commands available to a user. The function of a command may be varied based on distance. For example, if the distance between the user and the monitor is determined to be relatively small, then a user pointing at the screen may be associated with a "Print" command. If the distance is large, then pointing at the screen may be associated with magnifying the portion of the display at which the gesture is directed.

Both the content and the commands available may be modified based on distance. A distance between a user and a monitor may be determined. Based on the determined distance, a presentation style and available commands may be selected. A gesture input may be received and at least a portion of the content on the monitor may be modified based on the received gesture input, the presentation style of content, and the command available.

Figure 1:
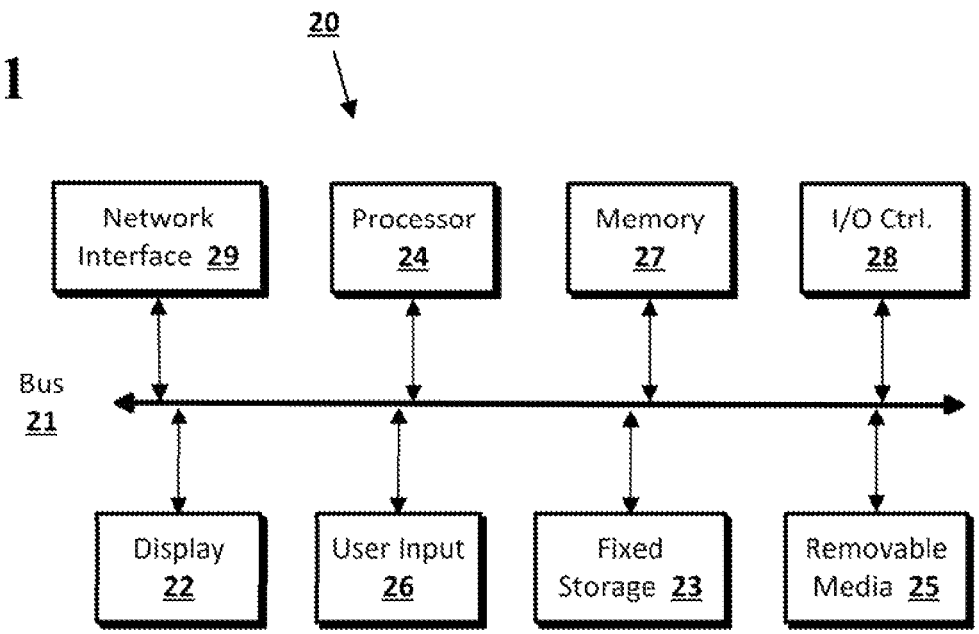
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
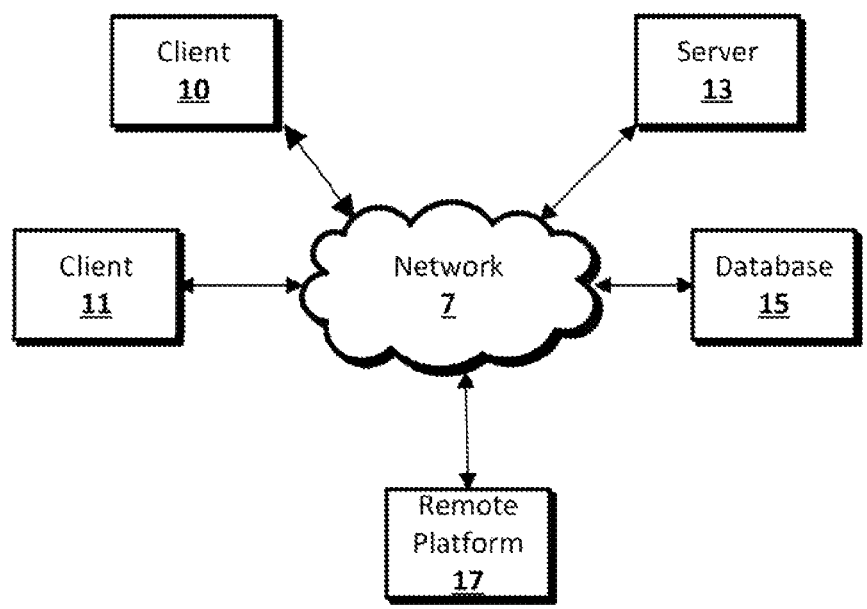
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In an implementation, a distance may be determined between a user and a device at 310. The device may be, for example, a display, a tablet, a computing device, a monitor, a television, a projection screen, or a stereo/speaker system. A distance may be determined using a camera collocated with the device. A depth camera may be used to capture a sequence of images from an environment. The collected images may be processed to determine if a user or object is present. In some configurations, a user may be detected by facial recognition. A sequence of images captured by a camera may be used to identify a particular gesture. For example, features identified in the sequence of images may be compared to a database of known gestures. The database may contain information about particular features or signatures of a gesture and the captured images may be analyzed for those features. A confidence score may be generated for a sequence of images that indicates whether the sequence contains a given gesture. For example, a gesture may be a set of features and a sequence of images may be a percentage of those features. If the confidence score meets a threshold, then the image sequence may be determined to contain the gesture. Other methods of pattern matching or image analysis may be used to determine whether a user is present in a captured image and/or whether a gesture has been received.

A horizontal distance between an object (e.g., a user) and the display may be determined based on one or more captured images from a camera. This distance may not be identical or similar to the actual distance between the object and the display or camera for implementations disclosed herein. The camera used to capture an image or sequence of images in an environment may be calibrated for distance measurements, for example, from the factory or as a component of a set-up procedure performed by a user. In some configurations, a single camera collocated with a display may be used to determine the distance between the camera and a detected user. In some configurations, a camera may not be collocated with the display but the display may be detected or identified as a component of a set-up procedure. For example, multiple cameras may be distributed in an environment. Each camera may provide information about the environment or camera itself (e.g., focal length, lens size, etc.) to a processing unit, a database, a server, or the like. The information provided by the cameras may be utilized to detect users, gestures, or objects such as a display. A reference object with a known size may be utilized to aid in distance determinations between the display and other objects in the field of view of the one or more cameras. A skilled artisan will recognize that other methods of determining a distance between a display and an object may be used according to any implementation disclosed herein. The determined distance 310 may refer to the actual distance or an approximation thereof or a relative distance such as the distance determined from an image of an environment.

Figure 3:
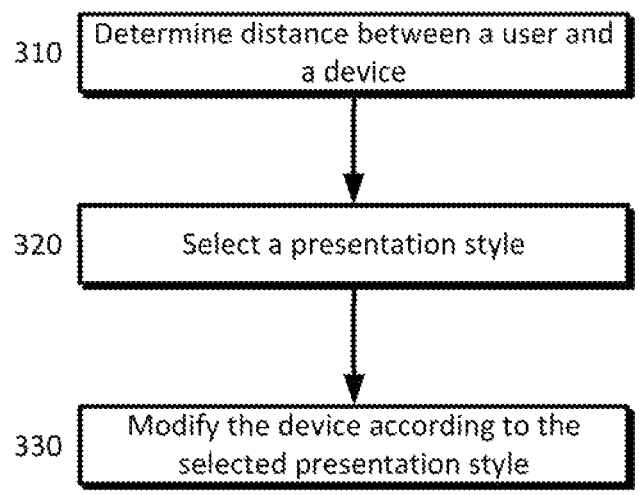
FIG. 3 shows an example process flow according to an implementation.

Returning to FIG. 3, based on the determined distance and an attribute, a presentation style of content on the display may be selected at 320. A presentation style may refer to a level of detail of content displayed and will be further discussed below. Examples of an attribute may include: user height, content context, a user profile, a user number, an environment, and a vantage point. For example, a user may enter information including a picture of the user, the user's height into a user profile. The user profile may also allow the user to configure the presentation style that the user would prefer to see at various distances from the display. One user may prefer a high level of detail including a touch interface at forty centimeters while another user may prefer to have minimal content displayed regardless of distance. Attributes, including a user profile, may be stored on a database. An attribute may also include a user number. If multiple users are detected, the system may determine a median or average distance of at least one user from the display. A content context may refer, for example, to what is being displayed such as a web page, a video game, a game mode, a video, text, music, an image, etc. Similarly an environment may refer to the location of the display. A location may be, for example, a public display, a living room, a ball room, a convention center, etc. A vantage point may refer to a user's position relative to the display. For example, a user that is significantly off axis from the center of the display may receive a different presentation style than if the user was on the center axis at the same distance away. In some configurations, a user may be designated as having primary control. The system may be configured to ignore other objects/users for the purposes of modifying the display. A primary user may be configured in a user profile or it may refer to the first individual the system detects at start-up or as the first person in a room or environment.

In addition to display content being altered based on distance, commands available to the user may be determined based on the determined distance. Command availability may also refer to a different function being assigned to the same command based on distance. A command may refer to a gesture, a voice command, or an input received by a keyboard, mouse, or input device. In some configurations the amount of content displayed may be reduced as the user moves further away from the display. If the content displayed is video, at large distances the display may show only the video and play/pause button. The commands available to the user may include stop/pause and exit. At closer distances, a user may be allowed to access additional controls. For example, the video may also have more controls such as fast forward/rewind in addition to play/pause and exit. In some configurations, the function of a command may be changed. For example, when a user is determined to be close to a screen, the fast forward may proceed at 10× playback speed whereas when the user is far from the screen, the fast forward may proceed at 5× playback speed.

In some configurations, a determined distance may be mapped to a range. A range may be, for example, 0-1 meters away from the screen. A range may also be defined by a threshold. For example, any distance under a defined threshold may be associated with a particular presentation style. The distances that make up a range may be predefined, such as based on an attribute as described earlier, or configured by an end-user. The number of ranges for a given system may also be predefined, such as based on an attribute, and/or configured by an end-user. In some configurations, the determined distance between a user and the display may be mapped to a table containing a range of distances and the corresponding presentation style. The table may be predefined, such as based on an attribute, and/or configured by the end-user. In some configurations, the predetermined distance may be mapped to a curve or graphical plot based on at least the presentation style and distance. In some instances, it may be desirable to have the presentation style linearly correlate with the determined distance while in other instances it may be desirable to have a non-linear relationship between the determined distance and presentation style.

At least a portion of the content on the display may be modified based on the presentation style of content at 330. Likewise, the commands available to the user may be modified based on distance. For example, it may be determined that the distance between the user and the display exceeds a threshold distance. The amount of content on the display may be increased or reduced. The number of commands may be increased or reduced in response to the determined distance. The available commands may not be modified commensurate with a presentation style. For example, a presentation style may have a different threshold value than that required to increase/decrease or otherwise modify the available commands.

Figure 4A:
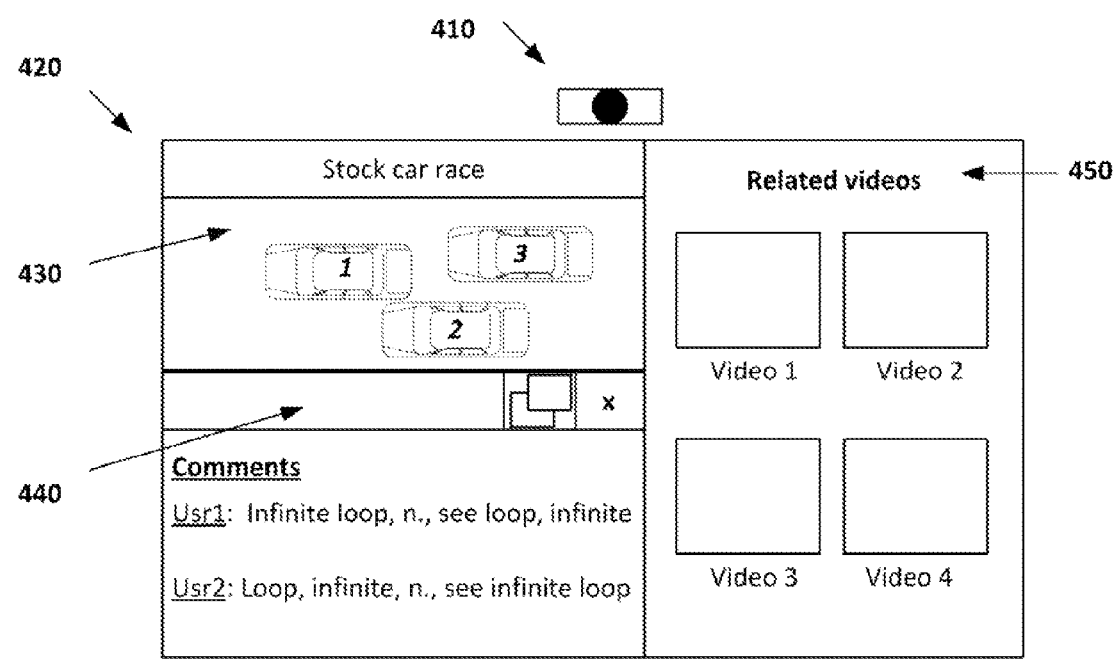
FIG. 4A shows an example of a display where the user is between the display and a first threshold.
Figure 4A:
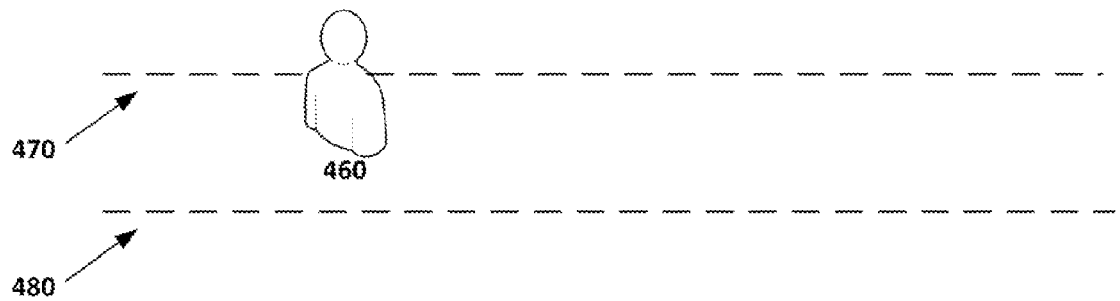
Figure 4B:
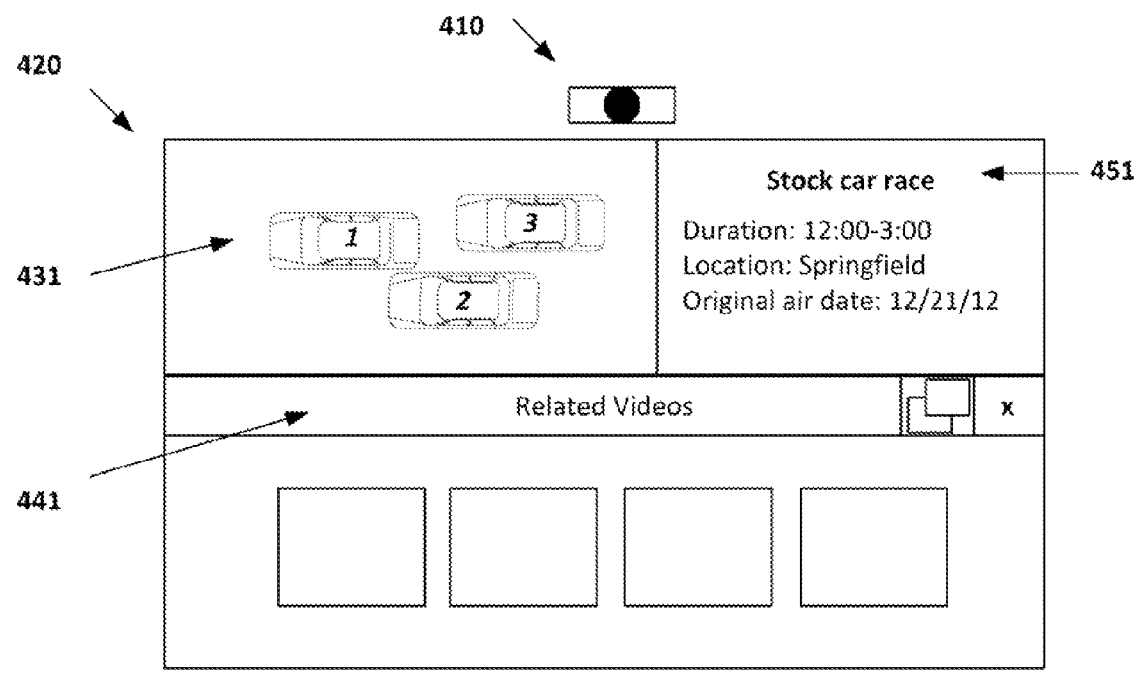
FIG. 4B shows an example of a display where the user is between the first threshold and a second threshold.
Figure 4B:
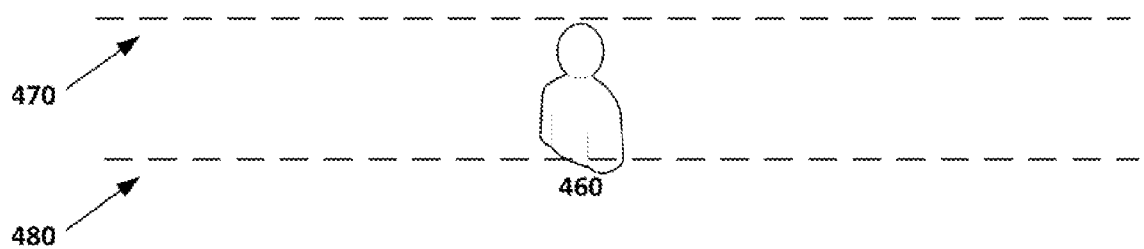
Figure 4C:
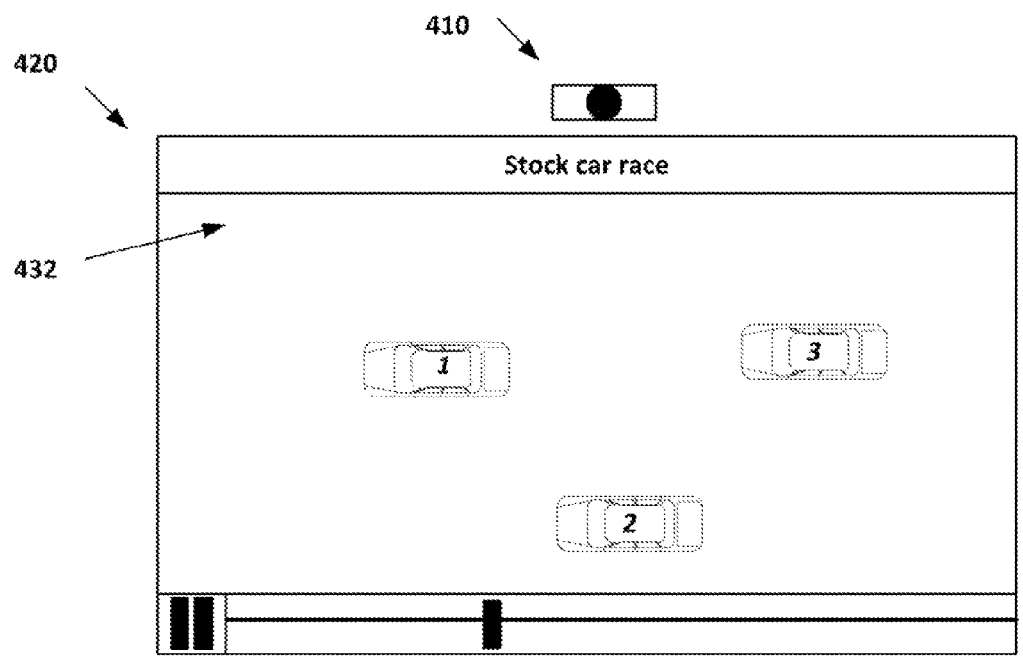
FIG. 4C shows an example of a display where the user is beyond the second threshold.
Figure 4C:
Figure 4C:
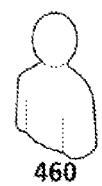

FIGS. 4A-C show an example of how content may be altered based on user distance from a display. In FIG. 4A, a display 420 is shown collocated with a depth camera 410. The depth camera 410 captures images from the display location and may process the images for command data (e.g., a gesture) or transmits the image sequences to a processor for such analysis. The display 420 shows a webpage with a first window 430 showing a stock car race, a second window 440 showing user comments, and a third window 450 showing videos related to the one shown in the first window 430. Based on the data obtained from the camera 410, a user may be determined to be within range represented by a first threshold marker 470 and the display 420. Based on the determined distance, the maximum amount of content may be displayed to the user 460. An attribute, such as the display size, the source of the content being displayed, a user profile, etc. may be utilized in addition to the determined distance to modify the content displayed. Because 460 the user 460 is determined to be proximal to the display 420 or between the display 420 and the first threshold 470, the user 460 may be provided with access to all commands typical of a web browsing experience including a touch enabled interaction if the display provides a touch-enabled interface. The user 460 however, may not be able to interact with speech or gesture commands.

In FIG. 4B, the user 460 is within a range bounded by the first threshold 470 and a second threshold marker 480. The first window 431 now appears with a title bar omitted. The second window 441 shows related videos; but, it does not indicate a title for each video as in FIG. 4A. The third window 451 displays information about the video being viewed in the first window 431. The user 460 may have access to spoken commands at this range and gesture based commands such as signaling speech, grabbing/pulling a window, enlarging a window, swiping, or throwing.

In FIG. 4C, the user 460 exceeds the second threshold 480. In this range, the display 420 may show only a single window 432 containing the video. The user may have access to only a subset of spoken or gesture commands such as on/off, play/pause, volume, and search. If the user 460 enters the range defined by the first threshold 470 and the second threshold 480, the display 420 may change to the one shown in FIG. 4B. The determination of presentation style and the available commands may be a dynamic process, responsive to the user's distance, an attribute, or the number of users in the room. A user may be determined to be a specified distance away from a monitor. The specified distance may be determined to fall within a range that causes the type of commands available to the user to be limited or expanded and that causes the format of the content displayed on the screen to be minimalistic. For example, commands may be limited to scrolling and/or selection of an item or even to voice commands. A minimalistic presentation style may, for example, present large icons, large text, and few options because a user is determined to be a great distance away. Similarly, the specified distance may be determined to be below a threshold that causes more precise commands to be available to the user and that causes a more detailed presentation of content. For example, a user may be allowed to scroll, access menus, drag-and-drop files, select individual items on the monitor, etc. The content provided may also be detailed such as providing menus, full text of web pages, complete file directories, etc. Thus, the display and/or the command interface may be adapted based on the user's distance to the display.

In an implementation, a scaling function for a display may be received. A scaling function may refer to a user preference. For example, a user preference may specify a presentation style for a display at various distances, ranges, number of users detected, or content sources such as web browsing, video, multimedia, audio, etc. For example, a user may be detected using facial recognition, voice recognition, a pattern recognition, or the like. In the event that no user is detected, the display may adopt a modified function such as turning off, pausing, or providing a delayed deactivation. The user's preferences may be stored on a local or remote database and provided to a processor associated with the display modification. A scaling function may refer to manner by which content is displayed on a display. Content for the display may be received. A distance between a user and the display may be determined. The output of the display may be modified based on the determined distance and the scaling function. In some configurations, a gesture set available to the user may be assigned based on at least one of the display, the determined distance, and the scaling function. A command availability may be determined based on the determined distance. The availability of a command may be modified based on the determined distance as described earlier.

In some instances, the content may be provided by, for example, a set top box and sent to a receiver or A/V processor. A processor responsible for providing an indication of the modification of the display may be a component of an A/V receiver, the display itself, or another local or remote processor. For example, the A/V processor may transmit video information to a local processor that modifies the data stream according to at least one of a presentation style, a scaling function, an attribute, and a determined distance. The processor may transmit the modification to a processor associated with the display.

Distance may affect display output in a number of ways, some of which have been described earlier. Information may be scaled based on distance. For example, from far away, two headlines may be visible on a display; but, as the user becomes closer to the display, more headlines may appear and/or text from one or more articles may appear beneath each headline.

The user interface may be adapted to the distance. For example, if a user is within touching distance of the display, buttons and other touch indicators may suggest to the user how to navigate/interact with the content. If, however, the user is further away, the buttons or touch indicators may disappear or change to suggest that they are now voice or gesture command responsive.

Volume may be adapted based on user distance as well. For example, if a user is having a video chat in a kitchen and moves away from the table where laptop used for the chat is located, the speaker volume and microphone sensitivity may adjust automatically to compensate for the user's increased distance. The speaker volume and microphone sensitivity may readjust when the user returns, proving the user and the person with whom the user is chatting the impression of constant volume.

As described earlier and shown in FIGS. 4A-C, content density may be modified based on distance. For example, if the user is playing music and is far from the screen, then the display may show the title of the song being played. If the user is standing near the display, it may show the playlist, the album associated with the song, relevant news about the artist, and suggestions of other music that the user might like.

A function may be modified based on the user distance from a display. For example, a display may be in a user's living room. When the user glances at it from the doorway or another room, the display may show the time. If, however, the user is proximal to the display, it may function as a stereo. From a distance of two meters (e.g., if the user is on a couch facing the display), the display may act as a media center, with an emphasis on movies. If the user is in a completely separate room from the display, it may function as a voice controlled personal assistant. If no user is present in the household in which the display is located, then it may act as a security system.

In an implementation, a system is provided that includes a database and a processor. The database may store, for example, a user preference, an attribute, a presentation style, information about a display, or the like. A processor may be connected to the display. The processor may be configured to receive a scaling function for a display. It may receive content for the display. In some configurations, the processor may determine a distance between a user and the display or it may receive an indication thereof. The processor may modify an output of the display based on the determined distance and the scaling function.

In an implementation, the presentation style of content shown on a display and/or the commands available to a user may be determined based on other distance measurements. In an implementation, the content and/or commands can be determined based on the distance between the user and an object other than the display. For example, the content and commands can be modified based on the distance of one user from another user, the distance of a user from a doorway, the distance of a user from designated point or line in a room, the distance of a user from a sensor that is in a location away from the display, etc. These can be measured, for example, by a camera as described above.

In various implementations, the content and commands on a display can be determined based upon a more than one distance. For example, the content and commands can be determined based on both the distance between a first user and a second user and the distance between the first user and the display. In an implementation, the content and commands can be determined based on the distance between a user and a sensor located away from the display, the distance between the user and the display and the distance between the user and another user.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
obtaining, by a device that includes a display and a camera, a first image and a later, second image;
obtaining, by the device, a first estimate of a distance between a user and the display based on the first image, and a later, second estimate of a distance between the user and the display based on the second image;
determining, by the device and based at least on the first estimate of the distance between the user and the display and the second estimate of the distance between the user and the display, that the user has crossed a predetermined distance threshold; and
in response to determining that the user has crossed the predetermined distance threshold, switching, by the device, between (i) a touch input mode in which touch inputs through the display are enabled, and speech or gesture inputs are disabled, and (ii) a gesture or speech input mode in which gesture or speech inputs are enabled, and touch inputs through the display are disabled.

2. The method of claim 1, comprising:
receiving a user input in a given input mode;
determining, from among multiple commands that are each associated with (I) the user input, (II) a respective distance, and (III) the given input mode, a particular command that is associated with (i) the user input, (ii) the second estimate, and (iii) the given input mode; and
providing the particular command to an application running on the device.

3. The method of claim 1, comprising:
selecting, from among multiple sets of commands that are each associated with (I) a respective distance and (II) the given input mode, a particular set of commands that are associated with (i) the second estimate and (ii) the given input mode; and
providing the user with a visual indication of the particular set of commands.

4. The method of claim 1, comprising:
determining an object estimate of a distance between the user and an object other than the display;
receiving a user input in a given input mode;
determining, from among multiple commands that are each associated with (I) the user input, (II) a respective distance, and (III) the given input mode, a particular command that is associated with (i) the user input, (ii) the object estimate, and (iii) the given input mode; and
providing the particular command to an application running on the device.

5. The method of claim 1, comprising:
selecting a particular user from among multiple users that are within a physical proximity of the display; and
wherein obtaining the first estimate of a distance between the user and the display comprises obtaining a first estimate of a distance between the particular user and the display, and the later, second of a distance between the user and the display comprises obtaining a second estimate of a distance between the particular user and the display.

6. A non-transitory computer-readable storage device having instructions stored thereon that, when executed by a computing device, cause the computing device to perform operations comprising:
obtaining, by a device that includes a display and a camera, a first image and a later, second image;
obtaining, by the device, a first estimate of a distance between a user and the display based on the first image, and a later, second estimate of a distance between the user and the display based on the second image;
determining, by the device and based at least on the first estimate of the distance between the user and the display and the second estimate of the distance between the user and the display, that the user has crossed a predetermined distance threshold; and
in response to determining that the user has crossed the predetermined distance threshold, switching, by the device, between (i) a touch input mode in which touch inputs through the display are enabled, and speech or gesture inputs are disabled, and (ii) a gesture or speech input mode in which gesture or speech inputs are enabled, and touch inputs through the display are disabled.

7. The storage device of claim 6, wherein the operations further comprise:
receiving a user input in a given input mode;
determining, from among multiple commands that are each associated with (I) the user input, (II) a respective distance, and (III) the given input mode, a particular command that is associated with (i) the user input, (ii) the second estimate, and (iii) the given input mode; and
providing the particular command to an application running on the device.

8. The storage device of claim 6, wherein the operations further comprise:
selecting, from among multiple sets of commands that are each associated with (I) a respective distance and (II) the given input mode, a particular set of commands that are associated with (i) the second estimate and (ii) the given input mode; and
providing the user with a visual indication of the particular set of commands.

9. The storage device of claim 6, wherein the operations further comprise:
determining an object estimate of a distance between the user and an object other than the display;
receiving a user input in a given input mode;
determining, from among multiple commands that are each associated with (I) the user input, (II) a respective distance, and (III) the given input mode, a particular command that is associated with (i) the user input, (ii) the object estimate, and (iii) the given input mode; and providing the particular command to an application running on the device.

10. The storage device of claim 6, wherein the operations further comprise:

selecting a particular user from among multiple users that are within a physical proximity of the display; and wherein obtaining the first estimate of a distance between the user and the display comprises obtaining a first estimate of a distance between the particular user and the display, and the later, second of a distance between the user and the display comprises obtaining a second estimate of a distance between the particular user and the display.

11. A system comprising:

one or more data processing apparatus; and a computer-readable storage device having stored thereon instructions that, when executed by the one or more data processing apparatus, cause the one or more data processing apparatus to perform operations comprising:

obtaining, by a device that includes a display and a camera, a first image and a later, second image;

obtaining, by the device, a first estimate of a distance between a user and the display based on the first image, and a later, second estimate of a distance between the user and the display based on the second image;

determining, by the device and based at least on the first estimate of the distance between the user and the display and the second estimate of the distance between the user and the display, that the user has crossed a predetermined distance threshold; and in response to determining that the user has crossed the predetermined distance threshold, switching, by the device, between (i) a touch input mode in which touch inputs through the display are enabled, and speech or gesture inputs are disabled, and (ii) a gesture or speech input mode in which gesture or speech inputs are enabled, and touch inputs through the display are disabled.

12. The system of claim 11, wherein the operations further comprise:

receiving a user input in a given input mode;

determining, from among multiple commands that are each associated with (I) the user input, (II) a respective distance, and (III) the given input mode, a particular command that is associated with (i) the user input, (ii) the second estimate, and (iii) the given input mode; and providing the particular command to an application running on the device.

13. The system of claim 11, wherein the operations further comprise:

selecting, from among multiple sets of commands that are each associated with (I) a respective distance and (II) the given input mode, a particular set of commands that are associated with (i) the second estimate and (ii) the given input mode; and providing the user with a visual indication of the particular set of commands.

14. The system of claim 11, wherein the operations further comprise:

determining an object estimate of a distance between the user and an object other than the display;

receiving a user input in a given input mode;

determining, from among multiple commands that are each associated with (I) the user input, (II) a respective distance, and (III) the given input mode, a particular command that is associated with (i) the user input, (ii) the object estimate, and (iii) the given input mode; and providing the particular command to an application running on the device.

* * * * *